United States Patent
Tate

(10) Patent No.: US 11,946,463 B2
(45) Date of Patent: Apr. 2, 2024

(54) WAVE DRIVEN VARIABLE LEVERAGE PUMP FOR WATER DESALINATION

(71) Applicant: BlueDesal Inc., Sausalito, CA (US)

(72) Inventor: Joseph B. Tate, Sausalito, CA (US)

(73) Assignee: BlueDesal Inc., Sausalito, CA (US)

( * ) Notice: Subject to any disclaimer, the term of this patent is extended or adjusted under 35 U.S.C. 154(b) by 0 days.

(21) Appl. No.: 17/982,211

(22) Filed: Nov. 7, 2022

(65) Prior Publication Data

US 2023/0142416 A1 May 11, 2023

Related U.S. Application Data

(60) Provisional application No. 63/276,683, filed on Nov. 8, 2021.

(51) Int. Cl.
*F04B 35/00* (2006.01)
*C02F 103/08* (2006.01)

(52) U.S. Cl.
CPC ........ *F04B 35/004* (2013.01); *C02F 2103/08* (2013.01)

(58) Field of Classification Search
CPC .................................................... F04B 35/004
USPC .......................................... 417/61, 331, 337
See application file for complete search history.

(56) References Cited

U.S. PATENT DOCUMENTS

| | | | | |
|---|---|---|---|---|
| 4,400,940 A * | 8/1983 | Watabe | ................. | F03B 13/182 417/330 |
| 4,490,621 A * | 12/1984 | Watabe | ................. | F03B 13/182 60/497 |
| 4,580,400 A * | 4/1986 | Watabe | ................. | F03B 13/182 417/330 |
| 4,931,662 A * | 6/1990 | Burton | ................. | F03B 13/1815 60/507 |
| 5,405,250 A * | 4/1995 | Vowles | ................. | F03B 13/1815 60/497 |
| 6,768,217 B2 * | 7/2004 | Chalmers | ................. | F03B 13/148 417/330 |
| 7,023,104 B2 * | 4/2006 | Kobashikawa | ........ | F03B 13/182 417/334 |
| 7,042,112 B2 * | 5/2006 | Wood | ................. | F03B 13/187 290/43 |
| 7,411,311 B2 * | 8/2008 | Tal-or | ................. | F03B 13/182 416/83 |
| 9,631,599 B2 * | 4/2017 | Tuokkola | ................. | F03B 13/14 |
| 9,902,467 B2 * | 2/2018 | Lin | ................. | B63B 21/50 |
| 2011/0018276 A1 * | 1/2011 | Whittaker | ................. | F03B 13/182 290/53 |
| 2014/0230426 A1 * | 8/2014 | Tuokkola | ................. | F03B 13/14 60/497 |

FOREIGN PATENT DOCUMENTS

WO WO-2007125156 A1 * 11/2007 ............ F03B 13/182

* cited by examiner

*Primary Examiner* — Thomas Fink
(74) *Attorney, Agent, or Firm* — Goodwin Procter LLP

(57) ABSTRACT

A wave driven variable leverage pump for water desalination is disclosed. According to one embodiment, a variable leverage pump comprises a platform and a paddle comprising at least one lever arm extending therefrom. The at least one lever arm is pivotally coupled with the platform. The pump further comprises a pump having a first end pivotally coupled with the platform, and a second end pivotally coupled with the paddle. A pivot point of the at least one lever arm is located above a pivot point of the pump relative to the platform.

11 Claims, 3 Drawing Sheets

WAVE DRIVEN VARIABLE LEVERAGE PUMP FOR WATER DESALINATION

CROSS-REFERENCE TO RELATED APPLICATIONS

This application claims priority to and the benefit of U.S. Provisional Application No. 63/276,683 titled "Wave Driven Variable Leverage Pump For Water Desalination" and filed Nov. 8, 2021, which is incorporated herein by reference in its entirety.

FIELD OF TECHNOLOGY

The present disclosure relates generally to pump technology and, more specifically, to a motion driven pump for desalination.

BACKGROUND

In some cases, a reverse osmosis process can be used to remove salt from ocean water to produce potable water. Removing salt from water may be referred to herein as "desalination". For water to pass through a reverse osmosis membrane, the water may be required to be pressurized to at least 800 PSI. Accordingly, improved pumps are desired that enable dynamic desalination of water.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

A wave driven variable leverage pump for water desalination is disclosed. According to one embodiment, a variable leverage pump (e.g., a wave driven variable leverage pump) comprises a platform and a paddle comprising at least one lever arm extending therefrom. The at least one lever arm is pivotally coupled with the platform. The pump further comprises a pump having a first end pivotally coupled with the platform, and a second end pivotally coupled with the paddle. A pivot point of the at least one lever arm is located above a pivot point of the pump relative to the platform.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
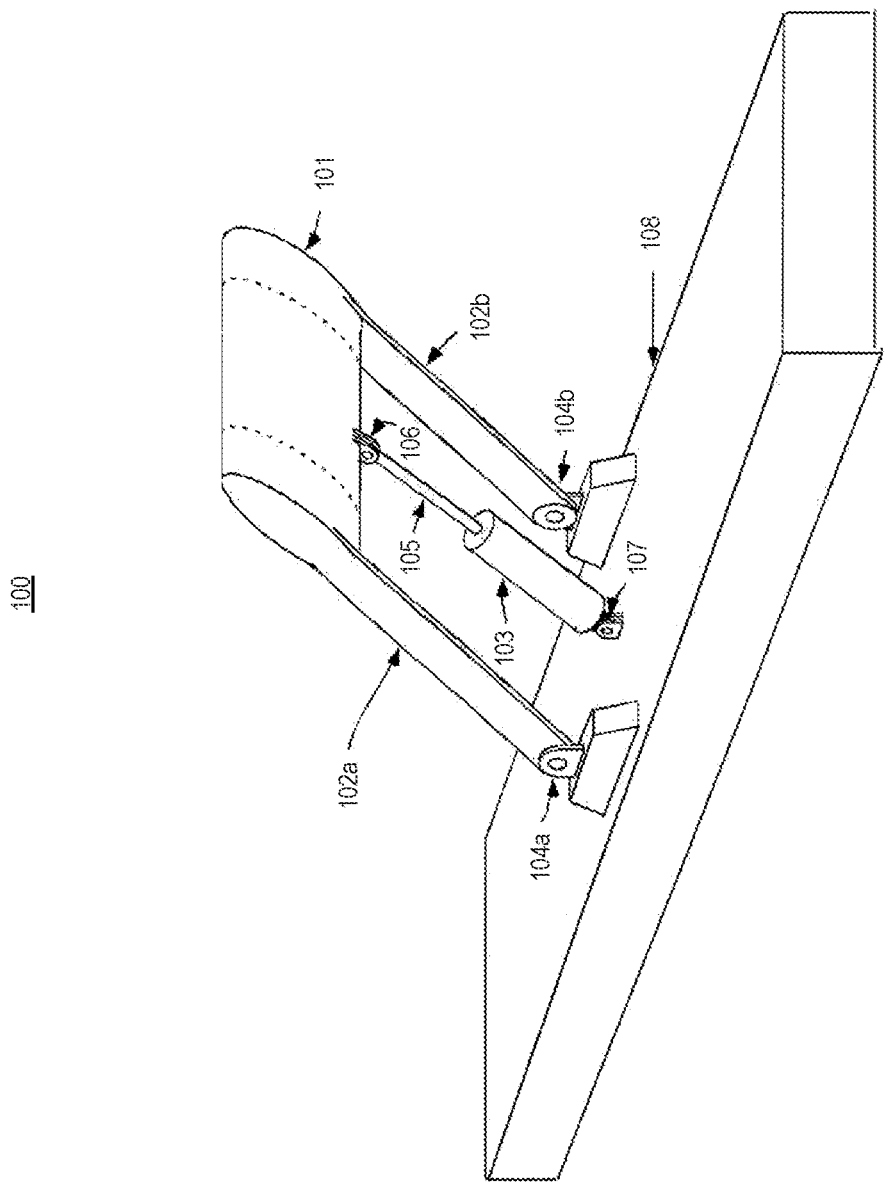
FIG. 1A is an illustration of an exemplary variable leverage pump, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

A variable leverage pump for water desalination is disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Wave Driven Variable Leverage Pump

Embodiments of a variable leverage pump are described herein. A variable leverage pump may use buoyant forces and inertial forces to pump water (e.g., seawater). As an example, a variable leverage pump may use wave power to pump seawater at high pressures (e.g., pressures exceeding 800 pounds per square inch (PSI)). As described herein, a reverse osmosis process can be used to desalinate and produce potable water. Accordingly, a variable leverage pump as described herein may be used to pump water (e.g., seawater) through a reverse osmosis membrane for desalination purposes.

In some embodiments, a variable leverage pump (also referred to herein as a "variable leverage actuator") may include a paddle. The paddle may be a buoyant (e.g., floating) paddle. The paddle may be coupled (e.g., attached) to one or more levers. A fulcrum of each of the one or more levers may be pivotally coupled (e.g., attached) to a platform. As an example, the platform may be a stable platform positioned adjacent to (e.g., resting on) a floor of a body of water (e.g., sea floor). In some cases, the variable leverage pump may be submerged in a body of water (e.g., ocean) to a suitable depth such that the paddle floats near the surface of the water.

Figure 1B:
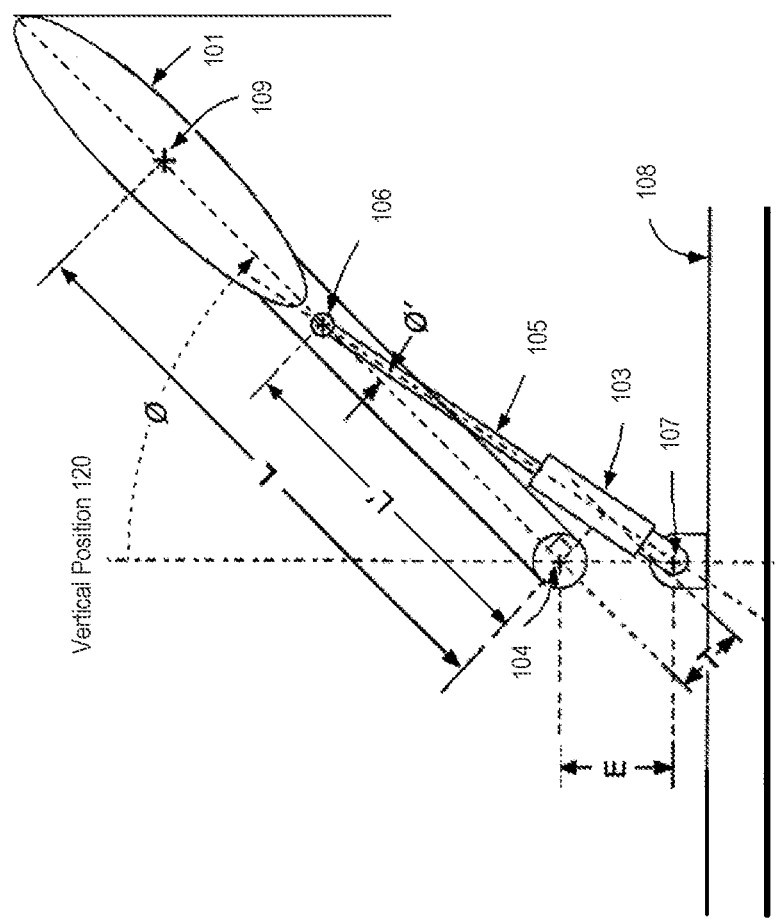
FIG. 1B is an illustration of an exemplary variable leverage pump, in accordance with some embodiments.

FIGS. 1A and 1B are illustrations of an exemplary variable leverage pump 100. The variable leverage pump 100 may include a paddle 101, one or more levers 102, a pump 103 (also referred to as a piston 103), one or more lever fulcrums 104, a piston rod 105, a force coupling 106, a pump fulcrum 107, and a platform 108. As shown in FIG. 1A, the paddle 101 may be coupled to the levers 102a and 102b (referred to collectively as the levers 102). In some cases, the paddle 101 may be an elliptic solid or other shape. The paddle 101 may have at least a threshold level of buoyancy to support the weight of the levers 102 (e.g., when the variable leverage pump 100 is submerged in water). Each of the levers 102 may be coupled (e.g., pivotally coupled) to a platform 108 by a respective lever fulcrum 104. As shown in FIG. 1A, the levers 102a and 102b may be pivotally coupled to the platform 108 by respective lever fulcrums 104a and 104b (collectively referred to as lever fulcrums 104). The levers 102 may rotate about the respective lever fulcrums 104.

In some embodiments, the paddle 101 may be coupled (e.g., pivotally coupled) to the piston rod 105 by the force coupling 106. The piston rod 105 may be coupled to the pump 103 (also referred to as a "piston"). The pump 103 may be a single action pump, such that the pump 103 may only generate pressure when the piston rod 105 into the pump 103 (e.g., during deflection of the paddle 101 from a vertical position). The pump 103 may be coupled (e.g., pivotally coupled) to the platform 108 by a pump fulcrum 107. The pump 103 may rotate about the pump fulcrum 107. Based on the coupling of the paddle 101, the levers 102, the pump 103, the piston rod 105, and the platform 108, the levers 102 may actuate the piston rod 105 within the pump 103. The levers 102 may rotate and cause actuation of the piston rod 105 within the pump 103 based on rotational movement of the paddle 101. Actuating the piston rod 105 within the pump 103 may cause the pump 103 to pressurize a fluid (e.g., water) available to the pump 103.

In some embodiments, paddle 101 may include and/or be comprised of a buoyant material, including a fiberglass material (e.g., a low mass fiberglass material). Each lever 102 may include and/or be comprised of a stainless steel and/or monel alloy material. The pump 103 and the piston rod 105 may each include and/or be comprised of a stainless steel and/or a monel alloy material. In some cases, the platform 108 may include mortar and/or plaster (e.g. cement) materials. In some cases, the platform 108 may include one or more metal (e.g., steel, iron, etc.) structures. The platform 108 may be comprised of a ferro-cement material including mortar and/or plaster materials combined with the metal structure(s).

In some cases, a reverse osmosis membrane may be coupled to the pump 103. An example of a reverse osmosis membrane used with the variable leverage pump 100 may be a Model M-S2521A membrane manufactured by Applied Membranes, Inc. The reverse osmosis membrane may have a threshold pressure of 800 PSI, such that a fluid (e.g., water) may flow through the membrane when the fluid is applied to a side of the membrane at a minimum pressure of 800 PSI. A housing may include the reverse osmosis membrane and may be coupled to the pump 103. A housing including the membrane may include and/or be comprised of a stainless steel and/or monel alloy material. An example of a housing include a reverse osmosis membrane that is used with the variable leverage pump 100 may be a housing manufactured by Spectra Watermakers, Inc.

In some embodiments, the lever fulcrums 104 corresponding to the levers 102 can be positioned at a distance above the pump fulcrum 107 corresponding to the pump 103. The lever fulcrums 104 may be positioned above the pump fulcrum 107 relative to the platform 108. Such positioning enables the variable leverage capabilities of the variable leverage pump 100, which can be advantageous for extracting power from variable waves when the variable leverage pump 100 is submerged underwater. Variable waves may refer to waves of a varying amplitude and/or a varying period.

In some embodiments, when the variable leverage pump 100 is submerged underwater, wave motion can act on the paddle 101. Wave motion may act on the paddle 101 in multiple ways, including by buoyancy forces and inertial forces. Buoyancy forces may be forces that move the paddle 101 and levers 102 into a vertical (e.g., upright) position. Inertial forces may be forces that deflect the paddle 101 and levers 102 from the vertical position toward a horizontal position. The inertial forces may deflect the paddle 101, thereby producing a downward force on the piston rod 105 through the force coupling 106. The downward force on the piston rod 105 via the force coupling 106 may actuate the piston rod 105, thereby pressurizing the pump 103. Actuating the pump 103 may cause water (e.g., seawater) included in and/or available to the pump 103 to be forced through the reverse osmosis membrane as described herein. For example, when the variable leverage pump 100 is submerged underwater, actuation of the piston rod 105 in the pump 103 by wave forces (e.g., including inertial forces) can force water through a reverse osmosis membrane based on the pump 103 pressurizing the water with a threshold level of pressure (e.g., 800 PSI).

In some embodiments, when the paddle 101 is positioned at a vertical position as described herein, any suitable wave may act on the paddle 101, move (e.g., displace) the paddle 101, and generate a pressure in the pump 103. Waves that apply a greater force to the paddle 101 may cause increased displacement of the paddle 101 and the levers 102 from a vertical position. An optimal force applied to the paddle 101 may be a force that causes a maximum displacement of the paddle 101 from a vertical position (e.g., toward a horizontal position). A maximum force that may be applied to the pump 103 (e.g., via the piston rod 105) may be a function of the area of the pump 103 (e.g., the area through which the piston rod 105 is actuated) and a pressure threshold corresponding to the reverse osmosis membrane coupled to the pump 103. As an example, the maximum force that can be applied to the pump 103 may be defined as the area of the pump 103 multiplied by the threshold pressure of the membrane, where the threshold pressure of the membrane may be 800 PSI.

With respect to FIG. 1B, when the paddle 101, levers 102, pump 103, and piston rod 105 are positioned in a vertical (e.g., upright) position 120, the mechanical advantage of the variable leverage pump 100 approaches infinity as motion on the pump 103 via the piston rod 105 approaches zero. As the paddle 101 is deflected (e.g., via inertial forces) from the vertical position 120 toward a horizontal position, the mechanical advantage becomes proportionally less and piston rod 105 motion increases. FIG. 1B illustrates a relationship between deflection and mechanical advantage for the variable leverage pump 100.

In some embodiments, with respect to FIG. 1B, a geometric center of the paddle 101 may be referred to as a center of effort 109. The length of a lever 102 may be referred to as L. The length between the lever fulcrum 104 and the force coupling 106 may be referred to as L'. The vertical distance (e.g., the fulcrum offset) between the lever fulcrum 104 and the pump fulcrum 107 may be referred to as E. A variable load arm may be referred to as T, which may be defined by Equation 1 as:

$$T = \tan(\varnothing')L' \qquad (1)$$

The angle Ø' may be an angle between the lever 102 and the piston rod 105 as shown in FIG. 1B. The angle Ø may be an angle of the center of effort 109 of the paddle 101 relative to the vertical position 120 as shown in FIG. 1B, which may be referred to as paddle deflection. When the center of effort 109 of the paddle 101 is positioned at the vertical position 120, the angle Ø may be 0°. When the center of effort 109 of the paddle 101 is positioned parallel to the platform 108, the angle Ø may be 90°. The leverage at the force coupling 106 may be defined by Equation 2 as:

$$\text{Leverage} = \frac{L}{T} \quad (2)$$

As the paddle 101 and lever(s) 102 are deflected further from the vertical position 120, T becomes greater and the leverage at the force coupling 106 is reduced accordingly. When the paddle deflection angle Ø is 90°, T may be equivalent to E, where E is the fulcrum offset. The minimum leverage of the variable leverage pump 100 may be defined by Equation 3 as:

$$\text{Minimum Leverage} = \frac{L}{E} \quad (3)$$

The greater the deflection of the lever(s) 102 from the vertical position 120 (e.g., as measured by the paddle deflection angle Ø), the greater the force required to move the lever(s) 102 from the vertical position 120. As an example, when the variable leverage pump 100 is submerged underwater, smaller, less forceful waves can actuate the piston rod 105 within the pump 103 with small deflections of the lever(s) 102. Larger, more forceful waves can actuate the piston rod 105 within the pump 103 with large deflections of the lever(s) 102. Waves may deflect the paddle 101 and lever(s) 102 until an equilibrium is reached between force of the wave and a resistance of the pump 103. The force of waves and the resistance of the pump 103 can form a system of automatic power matching. Based on the paddle 101 and lever(s) 102 being deflected from the vertical position 120, the buoyancy of the paddle 101 can move and return the unloaded paddle 101 and the lever(s) 102 to the vertical position 120.

In some cases, when the variable leverage pump 100 is submerged underwater, a cavity on which the pump 103 acts (e.g., included in the pump 103) may fill with water. The cavity (e.g., cavity included in the pump 103) may completely fill with water when the paddle 101 and lever(s) 102 are positioned at the vertical position 120. When the paddle 101 and lever(s) 102 are deflected from the vertical position 120 (e.g., based on forces from waves), the pump 103 may force the water included in the pump 103 through a reverse osmosis membrane (e.g., for desalination) and out of the pump 103, thereby reducing the amount of water included in the pump 103. The cavity of the pump 103 may refill with water as the unloaded paddle 101 and lever(s) 102 return to the vertical position 120 (e.g., due to the buoyancy of the paddle 101) and the piston rod 105 is moved out of the pump 103.

In an example, the variable leverage pump 100 may include lever(s) 102 of length L=20 feet and a fulcrum offset E=2 feet. For such an example, the leverage range of the variable leverage pump 100 may be 8 to less than ∞. A one-ton inertial wave force applied to the paddle 101 and lever(s) 102 can generate a minimum piston rod 105 force of 16 tons. Each full stroke of the piston rod 105 may be equivalent to the fulcrum offset E of 2 feet. For a six-inch diameter pump 103, a pressure of over 1100 PSI could be produced, which could require that a variable leverage pump 100 include a platform 108 of at least approximately 60 feet in length. Such a variable leverage pump 100 may be capable of producing several thousand gallons of desalinated water on a daily basis.

In another example, the variable leverage pump 100 may include lever(s) 102 of length L=20 feet, a fulcrum offset E=2 feet, a diameter of 5 inches for the pump 103, a stroke length of 3 feet for the pump 103, and a platform 108 having dimensions of 60 feet by 30 feet. For such a variable leverage pump 100, when the paddle 101 is moved 45° from the vertical position 120 (e.g., moved to half deflection) for each stroke of the pump 103 at 4 seconds per stroke, the piston rod 105 can move approximately 1 foot to cause the pump 103 to pump approximately 1 gallon of water through the reverse osmosis membrane per stroke. For a period where the variable leverage pump 100 operates for 24 hours at 4 seconds per stroke, the variable leverage pump 100 may operate at approximately 21,600 strokes per day and pump approximately 21,600 gallons of water through the reverse osmosis membrane. In some cases, approximately 80% of the pumped water will yield potable water, such that the variable leverage pump 100 yields approximately 17,280 gallons of potable water over the 24 period.

Figure 2:
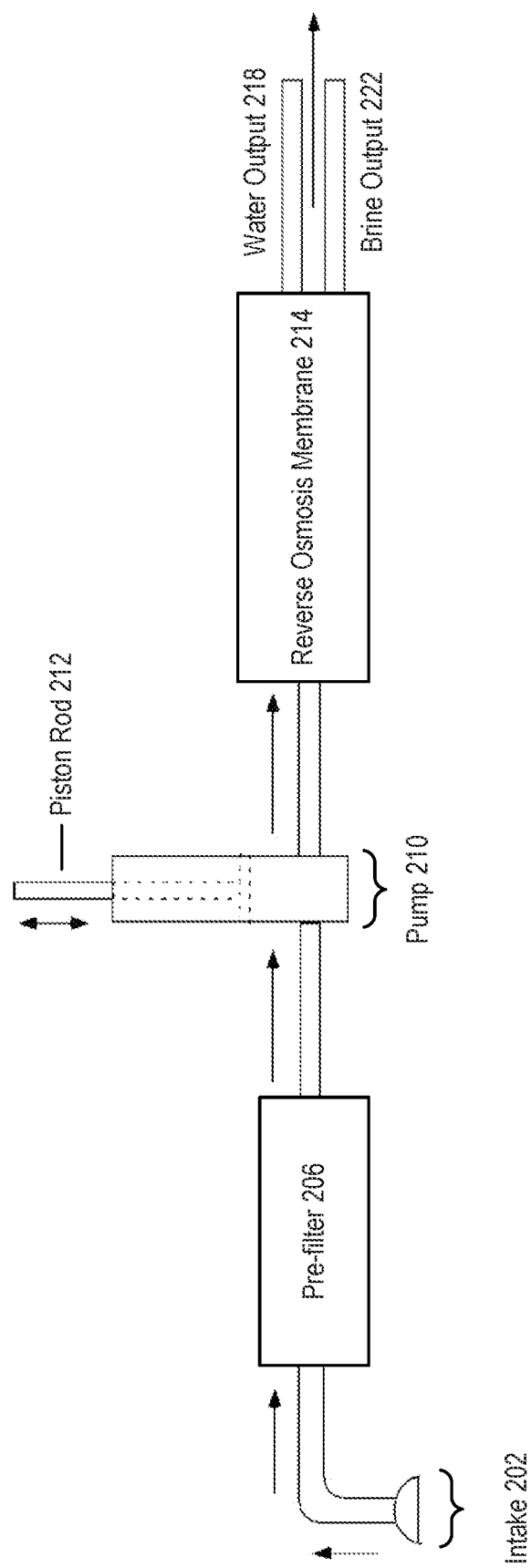
FIG. 2 is an illustration of an exemplary desalination system corresponding to variable leverage pump, in accordance with some embodiments.

FIG. 2 is an illustration of an exemplary desalination system 200 corresponding to a variable leverage pump, in accordance with some embodiments. As shown in FIG. 2, the desalination system 200 can include an intake 202, a pre-filter 206, a pump 210, a reverse osmosis membrane 214, a water output 218, and a brine output 222. The intake 202 may be coupled to the pre-filter 206. The pre-filter 206 may be coupled to the intake 202 and the pump 210. The pump 210 may be coupled to the pre-filter 206 and the reverse osmosis membrane 214. The reverse osmosis membrane 214 may be coupled to the pump 210 and may include a water output 218 and a brine output 222. The pre-filter 206 and the reverse osmosis membrane 214 may be each be included in a respective housing. Each housing may be coupled to the pump 210 by one or more connectors (e.g., brackets).

In some embodiments, the pump 210 may include and/or otherwise be coupled to a piston rod 212. The pump 210 may include any and/or all features of a pump (e.g., pump 103) as described herein. In some cases, the pump 210 may be analogous to the pump 103 described herein with respect to FIGS. 1A and 1B. The piston rod 212 may include any and/or all features of a piston rod (e.g., piston rod 105) as described herein. In some cases, the piston rod 212 may be analogous to the piston rod 105 described herein with respect to FIGS. 1A and 1B. The pump 210 and the piston rod 212 may be part of a variable leverage pump (e.g., variable leverage pump 100) as described herein. The piston rod 212 may be actuated within the pump 210 via a paddle (e.g., paddle 101), thereby causing water to be forced through the reverse osmosis membrane 214 for desalination purposes.

In some embodiments, the desalination system 200 may be submerged underwater and may desalinate water received via the intake 202. The directional arrows shown in FIG. 2 display an exemplary direction of water flow through the desalination system 200. When the desalination system 200 is submerged underwater, water may flow into the intake 202. After flowing into the intake 202, the water may flow through the pre-filter 206. The pre-filter 206 may filter debris and/or any other foreign objects from the water. After the pre-filter 206 filters the water that flows through the pre-filter 206, the water may flow to the pump 210. The water may flow to and fill a cavity corresponding to the pump 210. In some cases, the water may remain at the pump 210 and may not flow through the reverse osmosis membrane 214. A threshold amount of pressure may be required to be applied to the water (e.g., by the pump 210) to cause the water to flow through the reverse osmosis membrane 214. As an example, a threshold amount of water pressure required for the water to flow through the membrane may be 800 PSI.

In some cases, the piston rod 212 may actuate within the pump 210, thereby applying pressure to the water stored at the pump 210. Actuating the piston rod 212 within the pump 210 may pressurize the water and force the pressurized water through the reverse osmosis membrane 214. The water that flows through the reverse osmosis membrane 214 may be fresh, potable water. The potable water may exit the housing for the reverse osmosis membrane 214 through a water output 218. The water output 218 may be coupled to a storage tank and/or any suitable vessel configured to receive the potable water. In some cases, a brine including substances that are not permeable through the reverse osmosis membrane 214 may exit the housing for the reverse osmosis membrane 214 through the brine output 222.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A variable leverage pump comprising:
   a platform;
   a paddle;
   a first lever arm extending from the paddle, wherein the first lever arm is pivotally coupled with the platform by a first lever fulcrum, wherein the paddle and the first lever arm are configured to rotate about the first lever fulcrum; and
   a pump comprising:
      a first end pivotally coupled with the platform by a pump fulcrum, and a second end pivotally coupled with the paddle by a force coupling, wherein the pump is configured to rotate about the pump fulcrum and the force coupling, wherein the paddle and the first lever fulcrum are located above the pump fulcrum relative to the platform, wherein the pump fulcrum is positioned directly underneath the paddle when the paddle is vertically positioned relative to the platform.

2. The variable leverage pump of claim 1, wherein the paddle is buoyant.

3. The variable leverage pump of claim 1, further comprising a second lever arm extending from the paddle, wherein the first lever arm extends from a first end of the paddle, and wherein the second lever arm extends from a second end of the paddle.

4. The variable leverage pump of claim 1, wherein the pump is configured to output a water pressure of at least 800 pounds per square inch (PSI).

5. The variable leverage pump of claim 1, wherein the second end of the pump comprises a piston rod pivotally coupled with the paddle by the force coupling.

6. The variable leverage pump of claim 1, further comprising a reverse osmosis membrane, wherein the pump is configured to pressurize a fluid to flow through the reverse osmosis membrane.

7. The variable leverage pump of claim 3, wherein the second lever arm is pivotally coupled with the platform by a second lever fulcrum, and wherein each of the paddle, the first lever arm, and the second lever arm are configured to rotate about the first lever fulcrum and the second lever fulcrum.

8. The variable leverage pump of claim 7, wherein the first lever fulcrum is positioned on a first side of the pump fulcrum, and wherein the second lever fulcrum is positioned on a second side of the pump fulcrum opposite the first side of the pump fulcrum.

9. The variable leverage pump of claim 7, wherein the pump fulcrum is positioned between first lever fulcrum and the second lever fulcrum.

10. The variable leverage pump of claim 1, wherein the paddle is configured to apply variable leverage to the second end of the pump via the force coupling.

11. The variable leverage pump of claim 10, wherein the variable leverage is based on (i) a length of the first lever arm, (ii) a length between the first lever fulcrum and the force coupling, and (iii) an angular separation of the first lever arm and the pump relative to the force coupling.

* * * * *